United States Patent Office 2,776,246
Patented Jan. 1, 1957

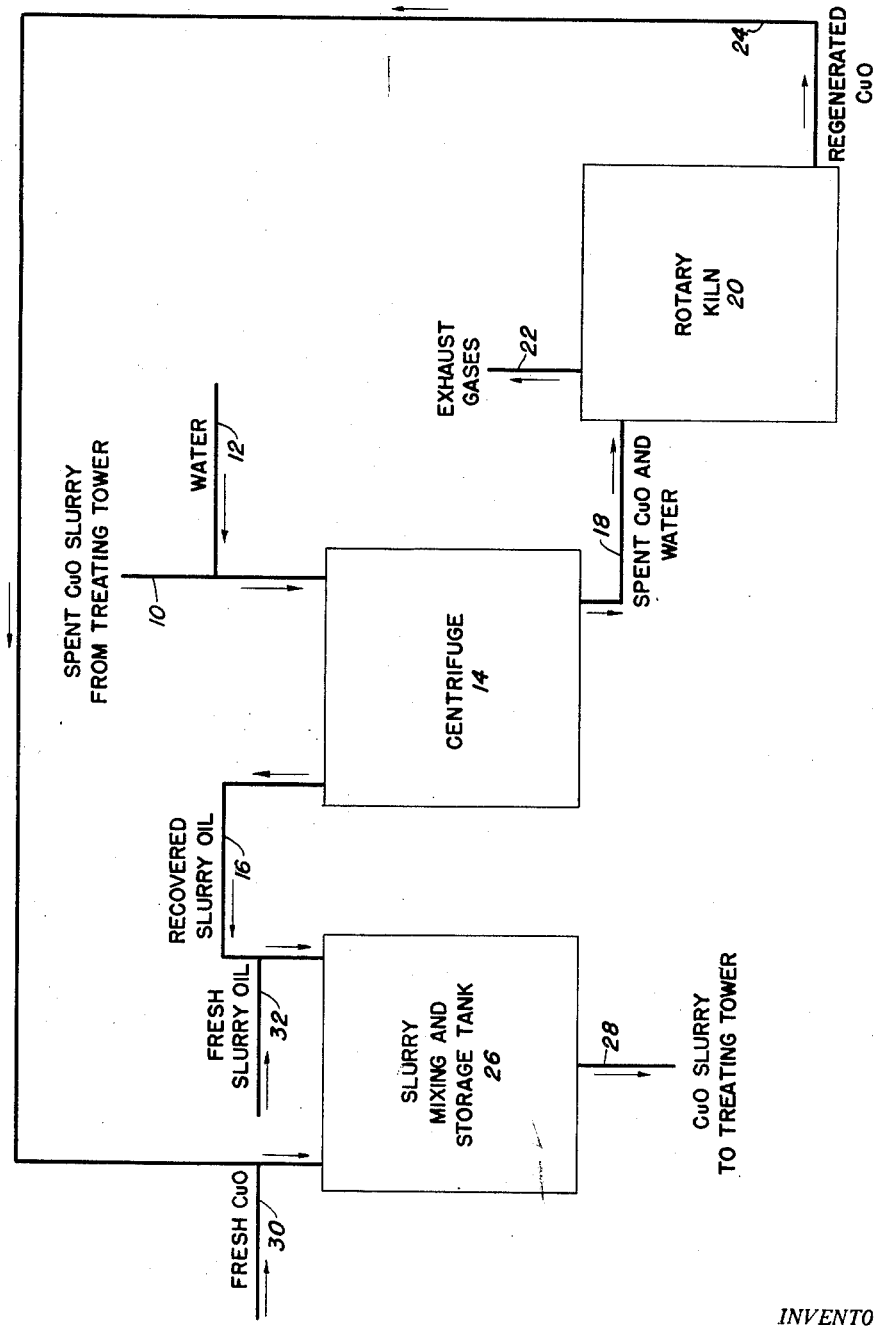

2,776,246

SEPARATION OF OIL FROM SPENT COPPER OXIDE SLURRIES

Le Roi E. Hutchings, Crystal Lake, and Milton M. Marisic, Elgin, Ill., assignors to The Pure Oil Company, Chicago, Ill., a corporation of Ohio Application November 19, 1952, Serial No. 321,386

5 Claims. (Cl. 196—30)

This invention relates to a method of separating copper compounds, insoluble in both water and hydrocarbon oils, from hydrocarbon oils containing such compounds in suspension, and particularly to an improved method for recovering spent copper oxide from treating slurries which have been employed in the desulfurization of crude hydrocarbon oils.

It is well known in the art that mineral oils can be desulfurized by contacting the oil with copper oxide. In accordance with conventional treating procedures, a suspension of copper oxide in an organic liquid is formed, and the hydrocarbon oil, ordinarily in the vaporous phase, is contacted with the copper oxide slurry. As a result of this treatment of the hydrocarbon oil with copper oxide, a spent copper oxide slurry containing varying amounts of sulfur as copper sulfide is obtained as a by-product. Due to the fact that copper is relatively expensive, the spent copper oxide must be regenerated for reuse in order to make the process commercially economical. Under present practice, the spent copper oxide is allowed to settle from the slurry, resulting in a heavy sludge, which is then burned to convert the copper sulfide present to copper oxide. The regenerated copper oxide obtained as a result of this regeneration is then recycled to the mineral oil treating step. Heretofore there has been no economically feasible method for removing slurry oil from the spent copper oxide slurry. As a result, approximately 20 to 60 percent by weight of the slurry oil is lost, and, due to the high concentration of slurry oil in the spent copper oxide which is fed to the burner, overheating occurs. This overheating during regeneration results in the fusion, agglommeration, and incomplete oxidation of the spent copper oxide, necessitating grinding and pulverization of the agglomerates prior to subjection to a second regeneration step to obtain the required cupric oxide. In addition, slurry oil resulting from the prior art methods of separation often contains objectionable amounts of solids and, as a result, is not well suited for reuse in the treating system. Thus, it is desirable in a process for recovering and regenerating spent copper oxide slurries to reduce the content of solids in the recovered slurry oil to a minimum and to reduce the content of oil retained in the spent copper oxide to as low a value as possible.

It is, therefore, an object of our invention to provide an improved method for separating copper compounds, insoluble in both water and hydrocarbon oils, from hydrocarbon oils containing such compounds in suspension.

Another object of our invention is to provide an improved method for recovering copper oxide from a spent copper oxide slurry which has been used in the desulfurization of hydrocarbon oils.

It is another and further object of our invention to provide an improved method of separating spent copper oxide from spent copper oxide slurries which have been used in the desulfurization of hydrocarbon oils whereby the amounts of solids remaining in the separated oil are reduced to a minimum and the amounts of oil remaining in the separated spent copper oxide is reduced to a minimum.

Still another object of our invention is to provide a method for separating spent copper oxide from spent copper oxide slurries which have been used in the desulfurization of hydrocarbon oils wherein the time required for separation is greatly reduced and economies in the initial cost of equipment are attained.

Other and further objects of our invention will be obvious to those skilled in the art by considering the following description of our invention.

In accordance with our invention, a slurry of hydrocarbon oil and copper compounds, which are insoluble in both water and the hydrocarbon oil, is mixed with sufficient water to contain all the solid copper compounds present and the mixture of slurry and water is then centrifuged at a temperature sufficient to guarantee fluidity of the slurry. As an alternative procedure, the addition of water and slurry may be performed in a continuous manner during the centrifuging operation. In a more limited aspect, a slurry of spent copper oxide which has been employed in the desulfurization of hydrocarbon oils, is centrifuged in the presence of sufficient water to contain all the spent copper oxide at a temperature between ambient temperature and the boiling point of water.

The term "spent copper oxide slurry" as used in the specification and claims of this application includes slurries of copper oxide and hydrocarbon oils containing varying amounts of copper sulfide. These spent copper oxide slurries are those obtained from the treatment of a hydrocarbon oil with copper oxide for the desulfurization of said oils and include the slurries resulting from processes wherein the copper oxide is mixed with a portion of the material being treated as well as those processes wherein copper oxide is mixed with an organic liquid obtained from an extraneous source. Spent copper oxide and recovered spent copper oxide as used herein are meant to include mixtures of copper oxide and copper sulfide.

Our invention will be more fully understood from the following description read in conjunction with the accompanying drawing wherein the figure is a simplified flow diagram illustrating the flow of materials through the treating steps of our process. In the interest of simplicity, various conventional valves, pumps, and other equipment familiar to one skilled in the art have not been included in the drawing.

Referring to the drawing, a spent copper oxide slurry obtained as a result of the treatment of a hydrocarbon oil with copper oxide is withdrawn from a conventional treating tower, not shown. This spent copper oxide slurry enters the treating system through line 10 and is mixed with water entering the system through line 12. This mixture of spent copper oxide slurry and water then passes to a centrifuge 14 wherein the spent copper oxide passes out of the oil phase and into the water phase and the two phases are separated. The recovered slurry oil is discharged from centrifuge 14 through line 16. The spent copper oxide and water are discharged from centrifuge 14 through line 18 and are passed to a rotary kiln 20 wherein the water present is flashed off and the copper sulfide component of the spent copper oxide is converted to copper oxide by burning. Exhaust gases and vapors from rotary kiln 20 are discharged through line 22. Regenerated copper oxide suitable for reuse in the treatment of hydrocarbon oils is discharged from rotary kiln 20 through line 24 and passes to slurry mixing and storage tank 26 wherein it is mixed with the recovered slurry oil being fed to tank 26 through line 16. The regenerated mixture of copper oxide and slurry oil is then returned to the treating tower, now shown, through line 28. In the event that fresh copper oxide is needed to replenish the supply of copper oxide, this material is added to slurry mixing and storage tank 26 through line 30. Fresh slurry oil may be introduced into the system through line 32.

In a copper oxide treating process in which copper oxide is fed directly to the treating tower and the slurry is made up of a portion of the oil being treated, slurry mixing and storage tank 26 may be eliminated, and regenerated copper oxide may be passed directly to the treating tower. In this system, recovered slurry oil may be combined directly with the hydrocarbon oil being introduced into the treating tower.

The oils employed as slurry oils in the present invention may be any oil ordinarily used for this purpose in the prior art and include materials such as naphthas, kerosine, virgin gas oil, etc. These slurry oils, as pointed out above, may be a portion of the hydrocarbon oil being treated or may be obtained from an extraneous source.

The spent copper oxide slurry is ordinarily continuously removed from the treating tower and contains varying amounts of copper sulfide in addition to the copper oxide and slurry oil. This slurry will ordinarily contain approximately 0.5 to 1 pound of solids per gallon of slurry oil. Stated differently, the slurry will have an oil content of approximately 80 to 95 percent by weight.

The spent copper oxide slurry obtained from the treating tower is mixed with sufficient water so that, upon separation of the spent oxide from the oil, the volume of water will be sufficient to contain all the solid components previously present in the slurry. That is, a volume of water at least equal to the apparent volume of solid material separated from the oil before occluded oil has been removed should be employed. This apparent volume of solid material may be readily ascertained in any given case by filtering a given amount of slurry and measuring the volume of solid material filtered out. However, it is preferable to employ amounts of water in excess of the amount necessary to contain all of the solid components. The amount of water employed, provided the minimal requirements set forth above are met, may also depend upon the type of centrifugal action involved in the separation. If a basket-type centrifuge is used and the water is not in continuous flow, the water should be approximately equal in volume to the total solids capacity of the basket. Expressed as a percentage of the volume of solids collected in the basket, the water added could vary from about 50 to 100 percent of solids. If a cartridge-type centrifuge is employed in which the flow of water and oil is continuous, there appears to be no limit to the amount of water used except that the amount of water "hold-up" in the cartridge would have to be sufficient to cause an interface of water and oil to form outside the solids deposited in the cartridge. This amount of water can be defined as equal in volume and rate of flow to the oil; or, in the case of a slurry containing 0.5 pound solids per gallon of oil, a weight-rate of flow equal to about 15 times that of the solids. It has been found that amounts of water in the range of about 10 to 100 percent by volume of the oil content of the slurry are most desirable.

The mixture of spent copper oxide slurry and water is then passed to a conventional centrifuge. In order to obtain a clear slurry oil, this centrifuge is preferably one capable of developing a centrifugal force of at least about 1,000 gravities. The amount of force used in practice will, of course, depend upon the type of centrifuge used, but, within the structural limitations of the centrifuge, the higher the force used the lower will be the oil content of the solids and the lower will be the solids content of the oil.

Temperatures during the centrifuging operation are preferably maintained in a range at which the slurry will remain in a fluid state. This temperature will naturally be dependent upon the viscosity of the slurry oil employed. Therefore, temperatures ranging from ambient temperature up to the boiling point of water may be employed. Temperatures above ambient temperatures may be maintained by any known means, such as preheating the slurry or heating the centrifuge.

The mixture of spent copper oxide and water withdrawn from the centrifuge can be passed directly to a rotary type kiln similar to those used in burning clay. The mixture of copper oxide and water is preferably passed countercurrent to the flow of hot combustion gases through the rotary kiln. In this manner, water will be flashed off as the mixture entering the kiln contacts the hot combustion gases, and copper sulfide will be converted to copper oxide as it approaches the discharge end of the kiln. Water may also be removed from the recovered spent copper oxide by inserting a preheater between the centrifuge and the kiln. A majority of the water present may thus be flashed off prior to the introduction of the spent copper oxide into the kiln.

As has been pointed out above, oustanding advantages in the separation of spent copper oxide from slurry oil are obtained by practicing our invention. In order to illustrate the superiority of our method of centrifuging in the presence of water over prior art methods of separating spent copper oxide from slurry oil and over other known methods of separating solids from liquids, a series of tests were conducted in which a spent copper oxide in a slurry oil of kerosine was treated by various separation methods, including centrifuging with water present, centrifuging in the absence of water, vacuum filtering, settling, and settling in the presence of water. All separations were carried out at ambient temperature in this series of experiments. The experiments to determine the effectiveness of centrifuging spent copper oxide slurries with water present were conducted using a pear-shaped centrifuge tube. The tube was filled with approximately 100 cc. of slurry oil (kerosine), 25 cc. of water, and about 7 gms. of spent copper oxide. The tube was shaken and placed in a size 1, type C, centrifuge (International Equipment Co.). The mixture was centrifuged for about five minutes at 1,800 R. P. M. The radial distance to the end of the tube was about 7 inches. The oil and water was then decanted from the packed solids and the solids were removed for analysis. Table I below lists the results obtained in this series of experiments:

*TABLE I*

*Separation of spent copper oxide from kerosine*

| Method of Separation | Water Content of Recovered Solids, Wt. Percent | Oil Content of Recovered Solids, Wt. Percent |
| --- | --- | --- |
| Centrifuging, water present | 15.1 | 5.3 |
| Centrifuging, no water | None | 14.3 |
| Vacuum filtering | do | 6.5 |
| Settling | | 16.8 |
| Settling, water present | Inoperative | |

From the above Table I, it may be seen that when the spent copper oxide slurry was centrifuged in the presence of water, the amount of residual slurry oil remaining in the copper oxide is only about one-third of the amount of residual oil present when the separation was carried out by settling or by centrifuging in the absence of water. It is also to be noted that settling in the presence of water failed to bring about a separation of the spent copper oxide from the slurry oil. Thus, by centrifuging the spent copper oxide slurry in the presence of water, a reduction in the oil content of the recovered solids substantially superior to that obtained by other methods of separation, with the exception of vacuum filtering, was obtained. With regard to vacuum filtering, it is to be observed that a reduction in oil content of the recovered solids at least equal to or greater than that obtained by vacuum filtering was obtained by centrifuging in the presence of water. There are obvious advantages in the employment of centrifuging over that of vacuum filtering in the separation of spent copper oxide from slurry oil. In the first instance, the initial cost of a suitable centrifuge is much less than the cost of a vacuum filter capable of handling the copper oxide slurry. Secondly, and even more important, several disadvantages arise in the use of a vacuum filter due to the fine particle size of the solids present in the spent copper oxide slurry. The solids found in a spent copper oxide slurry ordinarily pass through a screen of about 200 to 325 mesh. As a result of this fine particle size, a vacuum filter of extremely large size would be necessary and a rate of filtration which is to slow to be commercially feasible would result.

From the data appearing in Table I above, it can be seen that our process of separating spent copper oxide from slurry oil has a large number of distinct advantages, among which are reduction in the initial cost of equipment required, a speeding up of the process of separation, and a more complete separation between the slurry oil and the spent copper oxide. This last advantage is twofold in that the solids content of the recovered slurry oil is greatly reduced, thus making it suitable for reuse, and the amount of residual oil remaining in the recovered spent copper oxide is greatly reduced, thus reducing the danger of overheating in the regeneration step of the process.

It is to be understood that our invention is not to be limited to any particular source of spent copper oxide slurry, nor to any particular method of regenerating the spent copper oxide after it has been separated from the slurry oil, but that the invention is to be limited only by the scope of the claims appearing herein.

Having thus described and illustrated our invention, we claim:

1. In a method for desulfurizing a sulfur-containing hydrocarbon fraction wherein said hydrocarbon fraction is contacted with copper oxide and a slurry of spent copper oxide in a hydrocarbon oil is recovered, the method of recovering copper oxide for reuse, which comprises centrifuging said slurry in the presence of water to obtain a hydrocarbon oil phase substantially free of spent copper oxide and a water phase containing spent copper oxide, heating said water phase to a temperature sufficiently elevated to flash off water and regenerate spent copper oxide, and recovering copper oxide suitable for use in said contacting step.

2. In a method for desulfurizing a sulfur-containing hydrocarbon fraction wherein said hydrocarbon fraction is contacted with a slurry of copper oxide in a hydrocarbon slurry oil and a slurry of spent copper oxide in said slurry oil is recovered, the method of recovering copper oxide for reuse, which comprises adding water to said slurry in an amount at least sufficient to contain said spent copper oxide, centrifuging the resultant mixture of slurry and water at a temperature sufficiently elevated to maintain said mixture in a fluid state, thereby producing a hydrocarbon oil phase substantially free of spent copper oxide and a water phase containing spent copper oxide, heating said water phase to a temperature sufficiently elevated to flash off water and obtain a dried spent copper oxide, burning said dried spent copper oxide to regenerate said spent copper oxide, and recovering copper oxide suitable for use in said contacting step.

3. In a process for regenerating a spent copper oxide slurry obtained in the desulfurization of a petroleum oil by intimately contacting the petroleum oil with a copper oxide-containing treating agent, the steps which comprise centrifuging said slurry in the presence of sufficient amounts of added water to effect a substantial reduction in the oil content of the slurry, recovering an oil-phase substantially free from spent copper oxide, and a water-phase containing the spent copper oxide, treating said water-phase to remove the water and reactivate the spent copper oxide, and recovering a copper oxide suitable for use in said desulfurization.

4. A process in accordance with claim 3 in which 10 to 100%, by volume, of water based on the oil content of said slurry is employed.

5. A process in accordance with claim 3 in which said centrifuging is carried out at a temperature at which the slurry will remain in a fluid state.

References Cited in the file of this patent
UNITED STATES PATENTS

| | | |
|---|---|---|
| 1,232,104 | Sharples | July 3, 1917 |
| 1,460,718 | Hapgood | July 3, 1923 |
| 1,770,736 | Funk | July 15, 1930 |
| 2,228,041 | Yabroff et al. | Jan. 7, 1941 |
| 2,276,526 | Fuchs et al. | Mar. 17, 1942 |
| 2,384,967 | Schumacher et al. | Sept. 18, 1945 |
| 2,447,149 | Wier | Mar. 21, 1948 |